(12) United States Patent
Wang et al.

(10) Patent No.: US 12,326,073 B2
(45) Date of Patent: Jun. 10, 2025

(54) POWER SYSTEM AND FRACTURING DEVICE

(71) Applicant: YANTAI JEREH PETROLEUM EQUIPMENT & TECHNOLOGIES CO., LTD., Shandong (CN)

(72) Inventors: Jianwei Wang, Shandong (CN); Xiaolei Ji, Shandong (CN); Peng Zhang, Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 87 days.

(21) Appl. No.: 18/295,611

(22) Filed: Apr. 4, 2023

(65) Prior Publication Data
US 2023/0399929 A1 Dec. 14, 2023

Related U.S. Application Data

(63) Continuation of application No. PCT/CN2022/098238, filed on Jun. 10, 2022.

(51) Int. Cl.
*E21B 43/26* (2006.01)
*F16N 25/00* (2006.01)
*F15B 1/26* (2006.01)

(52) U.S. Cl.
CPC ......... *E21B 43/2607* (2020.05); *F16N 25/00* (2013.01); *F15B 1/26* (2013.01); *F15B 2211/20515* (2013.01); *F15B 2211/20576* (2013.01); *F15B 2211/3138* (2013.01); *F15B 2211/327* (2013.01); *F15B 2211/7142* (2013.01)

(58) Field of Classification Search
CPC ...... E21B 43/2607; F16N 25/00; F15B 11/17; F15B 2211/20515; F15B 2211/20576
See application file for complete search history.

(56) References Cited

U.S. PATENT DOCUMENTS 11,686,329 B2 * 6/2023 Wang ..................... F04B 53/18
166/177.5

FOREIGN PATENT DOCUMENTS

| CN | 111561485 B | * | 4/2022 | ............... F15B 1/02 |
| CN | 107327686 B | * | 9/2022 | ............. B21D 22/14 |
| WO | WO-2022017554 A1 | * | 1/2022 | ............. F15B 11/17 |

* cited by examiner

*Primary Examiner* — Michael Leslie
(74) *Attorney, Agent, or Firm* — Crowell & Moring LLP

(57) ABSTRACT

Some embodiments of the present disclosure provide a power system and a fracturing device. The power system includes an oil tank, a reduction gearbox and a hydraulic system. The reduction gearbox is provided with a lubricating system, and the lubricating system is communicated with the oil tank. The hydraulic system includes a hydraulic actuating member, and the hydraulic actuating member is communicated with the oil tank.

16 Claims, 1 Drawing Sheet

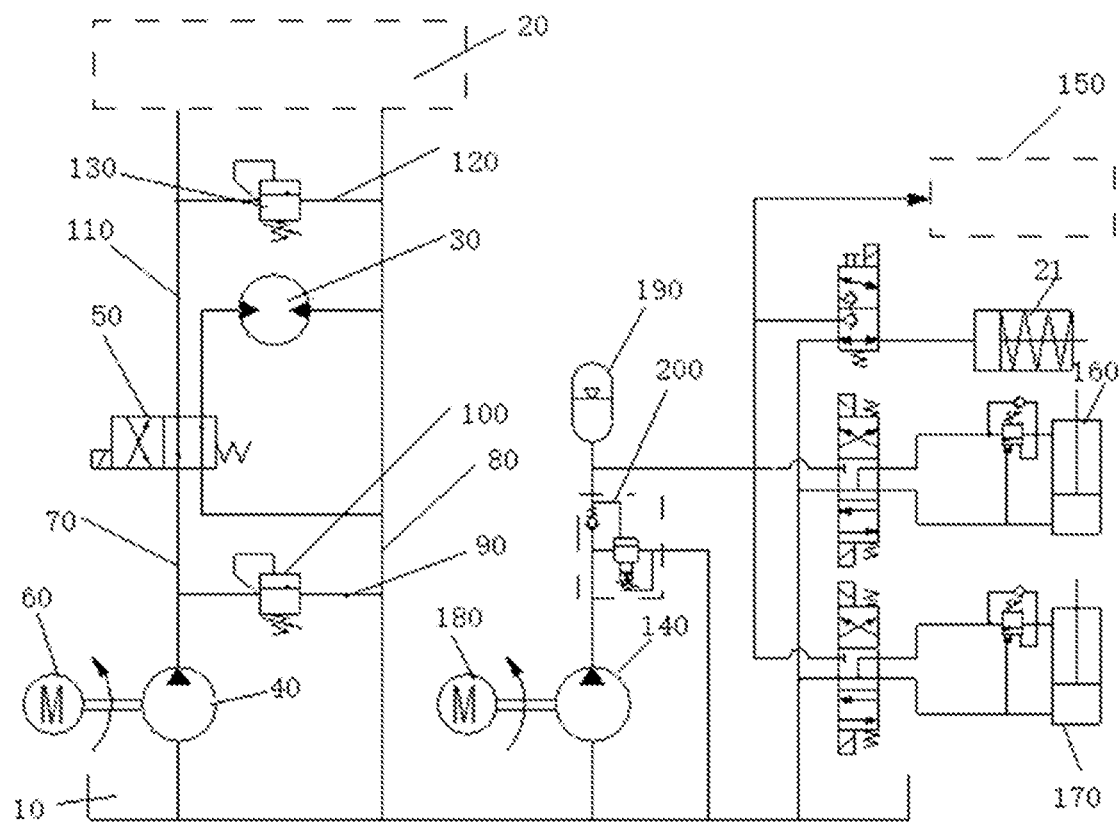

POWER SYSTEM AND FRACTURING DEVICE

CROSS-REFERENCE TO RELATED APPLICATIONS

The present disclosure is a bypass continuation application of International Patent Application No. PCT/CN2022/098238, filed on Jun. 10, 2022 and entitled "Power System and Fracturing Device", the contents of which are hereby incorporated by reference in their entireties.

TECHNICAL FIELD

The disclosure relates to a technical field of fracturing devices, and in particular to a power system and a fracturing device.

BACKGROUND

A turbo-fracturing device has been gradually applied to oilfield operation due to advantages of small size, light weight, high power and good fuel economy thereof. A maximum hydraulic power of one turbo-fracturing device can reach 5000 HP, which is equivalent to two 2500 HP conventional diesel fracturing trucks. In addition, the turbo-fracturing device is capable of 100% usage of natural gas from a well site as fuel, which greatly reduces the fuel cost, saves the operation cost and greatly reduces the emissions of nitrogen oxides, carbon dioxide and methane.

The main power components of the turbo-fracturing device include a main power assembly part and an auxiliary power assembly part. The main power assembly part is mainly to enable a turbine engine to drive a high-pressure plunger pump through a gearbox to pump fracturing fluid. The auxiliary power assembly part mainly provides power for some accessories before and after device operation or during the operation, such as opening an exhaust muffler cover of the turbine engine, starting the turbine engine of the main power assembly part and braking the gearbox in the main power assembly part before the device operation, and forced lubrication of gear pairs inside the reduction gearbox and plunger pump and heat dissipation of each system during the device operation. After the device operation is finished, the exhaust muffler cover of the turbine engine is closed by driving a lubricating system by the auxiliary power assembly part.

The auxiliary power assembly part of the turbo-fracturing device adopts a combination of a plurality of electromotors directly driving execution driving parts respectively and an electromotor driving a set of hydraulic systems, then the hydraulic systems driving the remaining execution parts to realize various auxiliary functions. Herein, a high-pressure lubricating pump for the plunger pump, a low-pressure lubricating pump for the plunger pump, a gearbox lubricating pump, a turbine engine cabin ventilation fan, a lubricating oil radiator fan for the plunger pump, a hydraulic oil radiator fan or a turbine engine lubricating oil radiator fan or a gearbox oil radiator fan, a turbine engine fuel pump and an air compressor are driven by independent electromotors respectively. The remaining execution parts, a muffler lower cover cylinder, a muffler upper cover cylinder, a turbine engine starting motor, a gearbox brake caliper and a control valve, are realized by an electromotor driving the hydraulic system. In the hydraulic system, two electromotors drive two hydraulic pumps respectively. One hydraulic pump provides power for the turbine engine starting motor, and the other hydraulic pump provides power for the muffler lower cover cylinder, the muffler upper cover cylinder, the gearbox brake caliper and the control valve.

It is to be seen that the gearbox lubricating system drives a gearbox lubrication pump through a gearbox lubricating electric motor, and the lubrication pump sucks oil from a gearbox lubricating oil tank and pumps same to a lubrication point inside the reduction gearbox. The hydraulic system includes two hydraulic pumps. An electromotor I drives the hydraulic pump I to suck oil from a hydraulic oil tank so as to provide power for the turbine engine starting a motor. An electromotor II drives the hydraulic pump II to suck oil from the hydraulic oil tank so as to provide power for the muffler upper cover cylinder, the gearbox brake caliper and the control valve.

The hydraulic system and the gearbox lubricating system are unrelated systems, which need to be equipped with independent hydraulic oil tank, electromotor I, hydraulic pump I, electromotor II and hydraulic pump II, and a gearbox lubricating oil tank, a gearbox lubricating electric motor and a gearbox lubricating pump. Since there are so many parts, the overall space of the device is more compact, the convenience for later device maintenance is weakened, and the overall cost of the device is higher.

SUMMARY

Some embodiments of the present disclosure mainly aims to provide a power system and a fracturing device, so as to solve the problems of large occupied space and high cost caused by the fact that a hydraulic system and a gearbox lubricating system are unrelated systems in existing art known to inventors.

In order to realize the above purpose, some embodiments of the present disclosure provide a power system, including an oil tank, a reduction gearbox and a hydraulic system. The reduction gearbox is provided with a lubricating system, and the lubricating system is communicated with the oil tank. The hydraulic system includes a hydraulic actuating member, and the hydraulic actuating member is communicated with the oil tank.

In some embodiments, the hydraulic system includes a plurality of hydraulic actuating members. The plurality of hydraulic actuating members include a motor configured to connect with an engine of a fracturing device. The power system further includes: a first hydraulic pump, an inlet of the first hydraulic pump being communicated with the oil tank; and a switching part, an outlet of the first hydraulic pump being communicated with an inlet end of the lubricating system through the switching part, and the outlet of the first hydraulic pump being communicated with an inlet of the motor through the switching part. The switching part has a first communication state that connects the outlet of the first hydraulic pump with the inlet end of the lubricating system and disconnects the outlet of the first hydraulic pump from the inlet of the motor, and a second communication state that disconnects the outlet of the first hydraulic pump from the inlet end of the lubricating system and connects the outlet of the first hydraulic pump with the inlet of the motor, and the switching part switches between the first communication state and the second communication state. An output end of the lubricating system and an outlet of the motor are both communicated with the oil tank.

In some embodiments, the switching part is an electromagnetic valve.

In some embodiments, the power system further includes a first driving member, and the first driving member is connected with the first hydraulic pump in a driving manner.

In some embodiments, the first driving member is an electromotor.

In some embodiments, the power system further includes: a first connecting pipe, a first end of the first connecting pipe being connected and communicated with the outlet of the first hydraulic pump, and a second end of the first connecting pipe being connected and communicated with the switching part; a second connecting pipe, a first end of the second connecting pipe being communicated with the oil tank, and the outlet of the motor and the output end of the lubricating system being both communicated with the second connecting pipe; a third connecting pipe, a first end of the third connecting pipe being connected and communicated with the first connecting pipe, a second end of the third connecting pipe being connected and communicated with the second connecting pipe, the second end of the third connecting pipe being located between the outlet of the motor and the first end of the second connecting pipe, and the second end of the third connecting pipe being located between the output end of the lubricating system and the first end of the second connecting pipe; and a safety valve, wherein the safety valve is provided on the third connecting pipe.

In some embodiments, the power system further includes: a second connecting pipe, a first end of the second connecting pipe being communicated with the oil tank, and the outlet of the motor and the output end of the lubricating system being both communicated with the second connecting pipe; a fourth connecting pipe, a first end of the fourth connecting pipe being connected and communicated with the switching part, and a second end of the fourth connecting pipe being communicated with the inlet end of the lubricating system; a fifth connecting pipe, a first end of the fifth connecting pipe being connected and communicated with the first connecting pipe, a second end of the fifth connecting pipe being connected and communicated with the second connecting pipe, and the second end of the fifth connecting pipe being located between the outlet of the motor and the output end of the lubricating system, and an overflow valve, wherein the overflow valve is provided on the fifth connecting pipe.

In some embodiments, the hydraulic system includes a plurality of hydraulic actuating members. The plurality of hydraulic actuating members include at least one first hydraulic actuating member. The power system further includes: a second hydraulic pump, an inlet of the second hydraulic pump being communicated with the oil tank, and an outlet of the second hydraulic pump being communicated with the at least one first hydraulic actuating member. The at least one first hydraulic actuating member includes at least one of a control valve, a brake of the reduction gearbox, a first oil cylinder configured to connect with a first cover plate of a muffler, and a second oil cylinder configured to connect with a second cover plate of the muffler.

In some embodiments, the power system further includes a second driving member. The second driving member is connected with the second hydraulic pump in a driving manner, and the second driving member is an electromotor.

Some embodiments of the present disclosure provided a fracturing device, including the above power system.

The power system of the disclosure includes an oil tank, a reduction gearbox and a hydraulic system. The hydraulic system includes a hydraulic actuating member, and a lubricating system and the hydraulic actuating member of the reduction gearbox are both communicated with the oil tank. The oil in the oil tank is used for lubricating the reduction gearbox and also for providing power for the hydraulic actuating member. The lubricating system and the hydraulic system share one oil tank, which avoids the problem of more parts of the power system caused by two independent oil tanks for the lubricating system and the hydraulic actuating member, reduces the space occupied by parts, optimizes the space layout of the power system, frees up more space, facilitates later device maintenance, and reduces the cost of the power system.

BRIEF DESCRIPTION OF THE DRAWINGS

The drawings consisting a part of the disclosure are used to provide further understanding of the present disclosure. The schematic embodiments of the disclosure and description thereof are used for explaining the disclosure and do not limit the disclosure improperly. In the drawings, FIG. 1 illustrates a schematic diagram of an embodiment of a power system according to the disclosure.

Herein, the above drawings include the following reference numbers:

10. an oil tank; 20. a reduction gearbox; 21. a brake; 30. a motor; 40. a first hydraulic pump; 50. a switching part; 60. a first driving member; 70. a third connecting pipe; 80. a second connecting pipe; 90. a third connecting pipe; 100. a safety valve; 110 a fourth connecting pipe; 120. a fifth connecting pipe; 130. an overflow valve; 140. a second hydraulic pump; 150. a control valve; 160. a first oil cylinder; 170. a second oil cylinder; 180. a second driving member; 190. an accumulator; and 200. an unloading valve.

DETAILED DESCRIPTION OF THE EMBODIMENTS

It is to be noted that the embodiments of the disclosure and the features in the embodiments may be combined with each other without conflict. The disclosure will be described in detail with reference to the accompanying drawings and embodiments.

It should be noted that the following detailed description is illustrative and is intended to provide a further description of the present disclosure. Unless otherwise indicated, all technical and scientific terms used herein have the same meaning as that commonly understood by those of ordinary skill in the art to which the present disclosure belongs.

It should be noted that the terms used here are only for describing specific implementation modes, and are not intended to limit the exemplary implementation modes according to the disclosure. As used herein, the singular form is also intended to include the plural form unless the context clearly indicates otherwise. In addition, it should also be understood that when the terms "comprising" and/or "including" are used in this specification, same indicate the presence of features, steps, operations, devices, components and/or combinations thereof.

Some embodiments of the present disclosure provide a power system, referring to FIG. 1, including: an oil tank 10, a reduction gearbox 20 and a hydraulic system. The reduction gearbox is provided with a lubricating system, and the lubricating system is communicated with the oil tank 10. The hydraulic system includes a hydraulic actuating member, and the hydraulic actuating member is communicated with the oil tank 10.

The power system of the disclosure includes an oil tank 10, a reduction gearbox 20 and a hydraulic system. The hydraulic system includes a hydraulic actuating member, and a lubricating system and the hydraulic actuating member of the reduction gearbox 20 are both communicated with the oil tank 10. The oil in the oil tank 10 is used for lubricating the reduction gearbox 20 and also for providing power for the hydraulic actuating member. The lubricating system and the hydraulic system share one oil tank, which avoids the problem of more parts of the power system caused by two independent oil tanks for the lubricating system and the hydraulic actuating member, reduces the space occupied by parts, optimizes the space layout of the power system, frees up more space, facilitates later device maintenance, and reduces the cost of the power system.

In practice, by comparing the properties of lubricating oil needed by the reduction gearbox and hydraulic oil of the hydraulic system, it is found that the viscosity of the two kinds of oil is similar at different temperatures. Therefore, it is determined that the same oil can be used as the working medium of the lubricating system and the hydraulic system.

In the embodiment, the hydraulic system includes a plurality of hydraulic actuating members. The plurality of hydraulic actuating members include a motor 30 configured to connect with an engine of a fracturing device. The power system further includes: a first hydraulic pump 40, an inlet of the first hydraulic pump 40 being communicated with the oil tank 10; and a switching part 50, an outlet of the first hydraulic pump 40 being communicated with an inlet end of the lubricating system through the switching part 50, and the outlet of the first hydraulic pump 40 being communicated with an inlet of the motor 30 through the switching part 50. The switching part 50 has a first communication state that connects the outlet of the first hydraulic pump 40 with the inlet end of the lubricating system and disconnects the outlet of the first hydraulic pump 40 from the inlet of the motor 30, and a second communication state that disconnects the outlet of the first hydraulic pump 40 from the inlet end of the lubricating system and connects the outlet of the first hydraulic pump 40 with the inlet of the motor 30, and the switching part 50 switches between the first communication state and the second communication state. An output end of the lubricating system and an outlet of the motor 30 are both communicated with the oil tank 10. Herein, the motor 30 is configured to start the engine of the fracturing device.

In practice, since the amount of oil required by the lubricating system is similar to the amount of oil required by the motor 30 of the hydraulic system starting the engine, and the two do not work at the same time, the first hydraulic pump 40 can supply oil to the lubricating system and the motor 30 through the switching action of the switching part 50 between the first communication state and the second communication state. In addition, through the switching action of the switching part 50, a single first hydraulic pump 40 can lubricate the reduction gearbox 20 and control the operation of the motor 30, thus reducing the cost.

In the embodiment, the switching part 50 may be an electromagnetic valve. When the electromagnetic valve is not energized, the first driving member 60 drives the first hydraulic pump to provide lubricating oil for the lubricating system of the reduction gearbox. When the electromagnetic valve is energized, the first driving member 60 drives the hydraulic pump to provide power for the motor 30. It is more convenient and quick for the electromagnetic valve to switch between the first communication state and the second communication state, and the electromagnetic valve is connected with a control system, which makes it easier to achieve remote control to switch the communication state.

In the embodiment, the power system further includes a first driving member 60, and the first driving member 60 is connected with the first hydraulic pump 40 in a driving manner.

In practice, the first driving member 60 is disposed so that the first hydraulic pump 40 can be driven, thus producing an effect of sucking oil from the oil tank 10, and providing power for the oil to flow to the lubricating system and the motor 30.

In the embodiment, the first driving member 60 is an electromotor.

In the embodiment, the power system further includes: a first connecting pipe 70, a first end of the first connecting pipe 70 being connected and communicated with the outlet of the first hydraulic pump 40, and a second end of the first connecting pipe 70 being connected and communicated with the switching part 50; a second connecting pipe 80, a first end of the second connecting pipe 80 being communicated with the oil tank 80, and the outlet of the motor 30 and the output end of the lubricating system being both communicated with the second connecting pipe 80; a third connecting pipe 90, a first end of the third connecting pipe 90 being connected and communicated with the first connecting pipe 70, a second end of the third connecting pipe 90 being connected and communicated with the second connecting pipe 80, the second end of the third connecting pipe 90 being located between the outlet of the motor 30 and the first end of the second connecting pipe 80, and the second end of the third connecting pipe 90 being located between the output end of the lubricating system and the first end of the second connecting pipe 80; and a safety valve 100, wherein the safety valve 100 is provided on the third connecting pipe 90.

In practice, the first connecting pipe 70 is configured to convey the oil in the oil tank 10 into the lubricating system and the motor 30. The second connecting pipe 80 is configured to return the oil discharged from the lubricating system and the motor 30 to the oil tank 10. The first connecting pipe and the second connecting pipe 80 make an oil circuit in the power system to circulate. The safety valve 100 installed on the third connecting pipe 90 ensures the safe operation of the first hydraulic pump 40, thus ensuring the safety of the power system.

In the embodiment, the power system further includes: a second connecting pipe 80, a first end of the second connecting pipe 80 being communicated with the oil tank 10, and the outlet of the motor 30 and the output end of the lubricating system being both communicated with the second connecting pipe 80; a fourth connecting pipe 110, a first end of the fourth connecting pipe 110 being connected and communicated with the switching part 50, and a second end of the fourth connecting pipe 110 being communicated with the inlet end of the lubricating system; a fifth connecting pipe 120, a first end of the fifth connecting pipe 120 being connected and communicated with the first connecting pipe 70, a second end of the fifth connecting pipe 120 being connected and communicated with the second connecting pipe 80, and the second end of the fifth connecting pipe 120 being located between the outlet of the motor 30 and the output end of the lubricating system; and an overflow valve 130, the overflow valve 130 is provided on the fifth connecting pipe 120.

In practice, the fourth connecting pipe 110 is disposed to convey the oil from the outlet of the switching part 50 to the inlet end of the lubricating system, so that the reduction gearbox 20 can be lubricated. The overflow valve 130 disposed on the fifth connecting pipe 120 prevents the pressure from exceeding the allowable value, thus ensuring that the system does not have an accident due to excessive pressure.

In the embodiment, the hydraulic system includes a plurality of hydraulic actuating members. The plurality of hydraulic actuating members include at least one first hydraulic actuating member. The power system further includes: a second hydraulic pump 140, an inlet of the second hydraulic pump 140 being communicated with the oil tank 10, and an outlet of the second hydraulic pump 140 being communicated with the at least one first hydraulic actuating member. Herein, the at least one first hydraulic actuating member includes at least one of a control valve 150, a brake 21 of the reduction gearbox 20, a first oil cylinder 160 configured to connect with a first cover plate of a muffler, and a second oil cylinder 170 configured to connect with a second cover plate of the muffler.

In practice, the second hydraulic pump 140 is disposed to pump the oil in the oil tank 10 to the control valve 150, the brake 21 of the reduction gearbox 20, the first oil cylinder 160 and the second oil cylinder 170.

In the embodiment, the control valve 150 may be a COMPRESSOR GUIDE VANE (CGV) control valve. Under the action of oil, the first oil cylinder 160 controls the first cover plate to act, and the second oil cylinder 170 controls the second cover plate to act.

In the embodiment, the power system further includes a second driving member 180. The second driving member 180 is connected with the second hydraulic pump 140 in a driving manner, and the second driving member 180 may be an electromotor. The second driving member 180 causes the second hydraulic pump 140 to pump oil in the oil tank 10 to each hydraulic actuating member, so that the hydraulic actuating members operate.

In the embodiment, the power system also includes an accumulator 190 and an unloading valve 200. An inlet of the unloading valve 200 is communicated with the outlet of the second hydraulic pump 140, the accumulator 190 is communicated with the outlet of the unloading valve 200, and the accumulator 190 is communicated with each first hydraulic actuating member. In practice, the second driving member 180 drives the second hydraulic pump 140 to suck oil from the oil tank 10, and then pumps the oil into the accumulator 190. When the pressure in the accumulator 190 reaches set pressure of the unloading valve 200, the second hydraulic pump 140 unloads. When the pressure in the accumulator 190 is lower than 85% of the set pressure of the unloading valve 200, the second hydraulic pump 140 re-conveys the oil into the accumulator 190, so repeatedly. The oil stored in the accumulator 190 provides power for the control valve, the brake, the first cylinder and the second cylinder. Specifically, the brake 21 of the reduction gearbox 20, the first oil cylinder 160 and the second oil cylinder 170 are all connected with the accumulator 190 through an electromagnetic valve.

Some embodiments of the disclosure also provide a fracturing device, including the power system in the above embodiment.

It is to be seen from the above descriptions that the above-mentioned embodiments of the disclosure have achieved the following technical effects.

The power system of the disclosure includes an oil tank 10, a reduction gearbox 20 and a hydraulic system. The hydraulic system includes a hydraulic actuating member, and a lubricating system and the hydraulic actuating member of the reduction gearbox 20 are both communicated with the oil tank 10. The oil in the oil tank 10 is used for lubricating the reduction gearbox 20 and also for providing power for the hydraulic actuating member. The lubricating system and the hydraulic system share one oil tank, which avoids the problem of more parts of the power system caused by two independent oil tanks for the lubricating system and the hydraulic actuating member, reduces the space occupied by parts, optimizes the space layout of the power system, frees up more space, facilitates later device maintenance, and reduces the cost of the power system.

It is to be noted that terms "first", "second", etc., in the specification, claims, and drawings of the disclosure are adopted not to describe a specific sequence or order but to distinguish similar objects. It is to be understood that data used like this may be interchanged as appropriate such that the implementation modes of the disclosure described here may be implemented, for example, according to sequences in addition to those illustrated or described here. In addition, terms "comprise", "comprising", "include", "including", "has", "having" or any other variations thereof, are intended to cover a non-exclusive inclusion. For example, a process, method, system, product or device that includes a list of steps or units is not necessarily limited to only those steps or units but may include other steps or units not expressly listed or inherent to such process, method, product or device.

For convenient description, spatially relativity terms such as "on", "above", "on the surface of", "on the top of" may be used herein to describe the spatial positional relationship of one device or one feature to other devices or features as shown in the drawings. It will be understood that the spatially relativity terms are intended to encompass different orientations used or operated in addition to the orientations of the devices described in the drawings. For example, if the device in the drawings is inverted, the device described as "on other devices or configurations" or "above other devices or configurations" will then be positioned "under other devices or configurations" or "below other devices or configurations". Thus, the exemplary term "above" may include both orientations of "above" and "below". The device may also be positioned in other different ways (rotated 90° or at other orientations) and the spatially relativity description used herein is interpreted accordingly.

The above is only the preferred embodiments of the disclosure and is not used to limit the disclosure. For those skilled in the art, there may be various changes and variations in the disclosure. Any modifications, equivalent replacements, improvements and the like made within the spirit and principle of the disclosure shall fall within the scope of protection of the disclosure.

What is claimed is:

1. A power system, comprising:
   an oil tank;
   a reduction gearbox, the reduction gearbox provided with a lubricating system, the lubricating system being communicated with the oil tank; and
   a hydraulic system comprising at least one hydraulic actuating member, which comprises a motor configured to connect with an engine of a fracturing device, the at least one hydraulic actuating member being communicated with the oil tank;
   a first hydraulic pump, an inlet of the first hydraulic pump being communicated with the oil tank; and
   a switching part, an outlet of the first hydraulic pump being communicated with an inlet end of the lubricating system through the switching part, the outlet of the first hydraulic pump being communicated with an inlet of the motor through the switching part, the switching part having a first communication state that connects the outlet of the first hydraulic pump with the inlet end of the lubricating system and disconnects the outlet of the first hydraulic pump from the inlet of the motor, and a second communication state that disconnects the outlet of the first hydraulic pump from the inlet end of the lubricating system and connects the outlet of the first hydraulic pump with the inlet of the motor, and the switching part switching between the first communication state and the second communication state, wherein an output end of the lubricating system and an outlet of the motor are both communicated with the oil tank.

2. The power system as claimed in claim 1, wherein the switching part comprises an electromagnetic valve.

3. The power system as claimed in claim 2, wherein the at least one hydraulic actuating member comprises at least one first hydraulic actuating member, wherein the power system further comprises:
a second hydraulic pump, an inlet of the second hydraulic pump being communicated with the oil tank, and an outlet of the second hydraulic pump being communicated with the at least one first hydraulic actuating member, wherein the at least one first hydraulic actuating member comprises at least one of a control valve, a brake of the reduction gearbox, a first oil cylinder configured to connect with a first cover plate of a muffler, and a second oil cylinder configured to connect with a second cover plate of the muffler.

4. The power system as claimed in claim 1, further comprising a first driving member, wherein the first driving member is connected with the first hydraulic pump in a driving manner.

5. The power system as claimed in claim 4, wherein the at least one hydraulic actuating member comprises at least one first hydraulic actuating member, wherein the power system further comprises:
a second hydraulic pump, an inlet of the second hydraulic pump being communicated with the oil tank, and an outlet of the second hydraulic pump being communicated with the at least one first hydraulic actuating member, wherein the at least one first hydraulic actuating member comprises at least one of a control valve, a brake of the reduction gearbox, a first oil cylinder configured to connect with a first cover plate of a muffler, and a second oil cylinder configured to connect with a second cover plate of the muffler.

6. The power system as claimed in claim 4, wherein the first driving member is an electromotor.

7. The power system as claimed in claim 6, wherein the at least one hydraulic actuating member comprises at least one first hydraulic actuating member, wherein the power system further comprises:
a second hydraulic pump, an inlet of the second hydraulic pump being communicated with the oil tank, and an outlet of the second hydraulic pump being communicated with the at least one first hydraulic actuating member, wherein the at least one first hydraulic actuating member comprises at least one of a control valve, a brake of the reduction gearbox, a first oil cylinder configured to connect with a first cover plate of a muffler, and a second oil cylinder configured to connect with a second cover plate of the muffler.

8. The power system as claimed in claim 1, further comprising:
a first connecting pipe, a first end of the first connecting pipe being connected and communicated with the outlet of the first hydraulic pump, and a second end of the first connecting pipe being connected and communicated with the switching part;
a second connecting pipe, a first end of the second connecting pipe being communicated with the oil tank, and the outlet of the motor and the output end of the lubricating system being both communicated with the second connecting pipe;
a third connecting pipe, a first end of the third connecting pipe being connected and communicated with the first connecting pipe, a second end of the third connecting pipe being connected and communicated with the second connecting pipe, the second end of the third connecting pipe being located between the outlet of the motor and the first end of the second connecting pipe, and the second end of the third connecting pipe being located between the output end of the lubricating system and the first end of the second connecting pipe; and
a safety valve, wherein the safety valve is provided on the third connecting pipe.

9. The power system as claimed in claim 8, wherein the at least one hydraulic actuating member comprises at least one first hydraulic actuating member, wherein the power system further comprises:
a second hydraulic pump, an inlet of the second hydraulic pump being communicated with the oil tank, and an outlet of the second hydraulic pump being communicated with the at least one first hydraulic actuating member, wherein the at least one first hydraulic actuating member comprises at least one of a control valve, a brake of the reduction gearbox, a first oil cylinder configured to connect with a first cover plate of a muffler, and a second oil cylinder configured to connect with a second cover plate of the muffler.

10. The power system as claimed in claim 8, further comprising:
a fourth connecting pipe, a first end of the fourth connecting pipe being connected and communicated with the switching part, and a second end of the fourth connecting pipe being communicated with the inlet end of the lubricating system;
a fifth connecting pipe, a first end of the fifth connecting pipe being connected and communicated with the first connecting pipe, a second end of the fifth connecting pipe being connected and communicated with the second connecting pipe, and the second end of the fifth connecting pipe being located between the outlet of the motor and the output end of the lubricating system, and
an overflow valve, wherein the overflow valve is provided on the fifth connecting pipe.

11. The power system as claimed in claim 10, wherein the at least one hydraulic actuating member comprises at least one first hydraulic actuating member, wherein the power system further comprises:
a second hydraulic pump, an inlet of the second hydraulic pump being communicated with the oil tank, and an outlet of the second hydraulic pump being communicated with the at least one first hydraulic actuating member, wherein the at least one first hydraulic actuating member comprises at least one of a control valve, a brake of the reduction gearbox, a first oil cylinder configured to connect with a first cover plate of a muffler, and a second oil cylinder configured to connect with a second cover plate of the muffler.

12. The power system as claimed in claim 1, wherein the at least one hydraulic actuating members further comprises at least one first hydraulic actuating member, wherein the power system further comprises:

a second hydraulic pump, an inlet of the second hydraulic pump being communicated with the oil tank, and an outlet of the second hydraulic pump being communicated with the at least one first hydraulic actuating member, wherein the at least one first hydraulic actuating member comprises at least one of a control valve, a brake of the reduction gearbox, a first oil cylinder configured to connect with a first cover plate of a muffler, and a second oil cylinder configured to connect with a second cover plate of the muffler.

13. The power system as claimed in claim 12, further comprising a second driving member, wherein the second driving member is connected with the second hydraulic pump in a driving manner, the second driving member being an electromotor.

14. A fracturing device, comprising a power system, the power system comprising:

an oil tank;

a reduction gearbox, provided with a lubricating system, the lubricating system being communicated with the oil tank;

a hydraulic system comprising a plurality of hydraulic actuating members, which comprise a motor configured to connect with an engine of a fracturing device, the plurality of hydraulic actuating members being communicated with the oil tank and configured to drive at least one component of the fracturing device;

a first hydraulic pump, an inlet of the first hydraulic pump being communicated with the oil tank; and a switching part, an outlet of the first hydraulic pump being communicated with an inlet end of the lubricating system through the switching part, the outlet of the first hydraulic pump being communicated with an inlet of the motor through the switching part, the switching part having a first communication state that connects the outlet of the first hydraulic pump with the inlet end of the lubricating system and disconnects the outlet of the first hydraulic pump from the inlet of the motor, and a second communication state that disconnects the outlet of the first hydraulic pump from the inlet end of the lubricating system and connects the outlet of the first hydraulic pump with the inlet of the motor, and the switching part switching between the first communication state and the second communication state, wherein an output end of the lubricating system and an outlet of the motor are both communicated with the oil tank.

15. The fracturing device as claimed in claim 14, wherein the power system further comprises:

a first connecting pipe, a first end of the first connecting pipe being connected and communicated with the outlet of the first hydraulic pump, and a second end of the first connecting pipe being connected and communicated with the switching part;

a second connecting pipe, a first end of the second connecting pipe being communicated with the oil tank, and the outlet of the motor and the output end of the lubricating system being both communicated with the second connecting pipe;

a third connecting pipe, a first end of the third connecting pipe being connected and communicated with the first connecting pipe, a second end of the third connecting pipe being connected and communicated with the second connecting pipe, the second end of the third connecting pipe being located between the outlet of the motor and the first end of the second connecting pipe, and the second end of the third connecting pipe being located between the output end of the lubricating system and the first end of the second connecting pipe; and a safety valve, wherein the safety valve is provided on the third connecting pipe.

16. The fracturing device as claimed in claim 14, wherein the plurality of hydraulic actuating members comprising at least one first hydraulic actuating member, wherein the power system further comprises:

a second hydraulic pump, an inlet of the second hydraulic pump being communicated with the oil tank, and an outlet of the second hydraulic pump being communicated with the at least one first hydraulic actuating member, wherein the at least one first hydraulic actuating member comprises at least one of a control valve, a brake of the reduction gearbox, a first oil cylinder configured to connect with a first cover plate of a muffler, and a second oil cylinder configured to connect with a second cover plate of the muffler.

* * * * *